United States Patent Office 3,445,342
Patented May 20, 1969

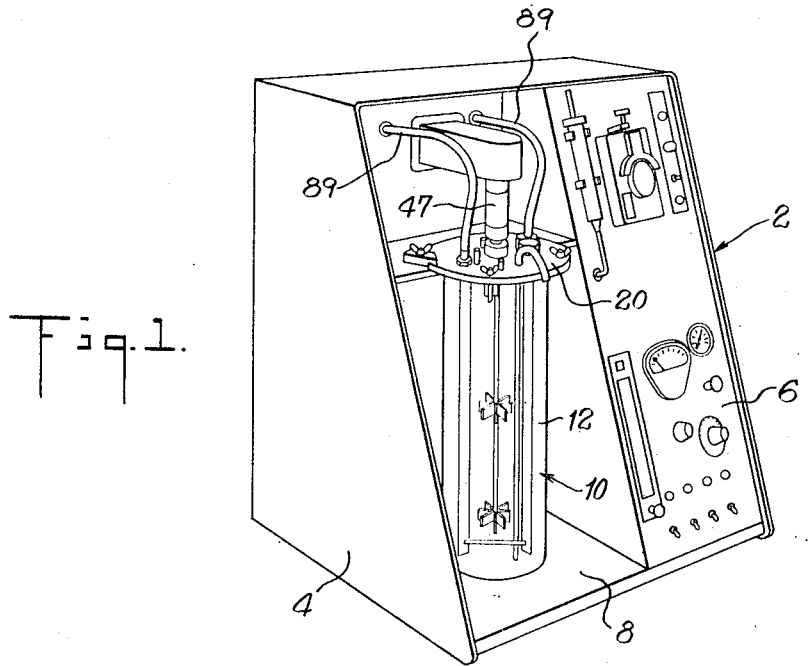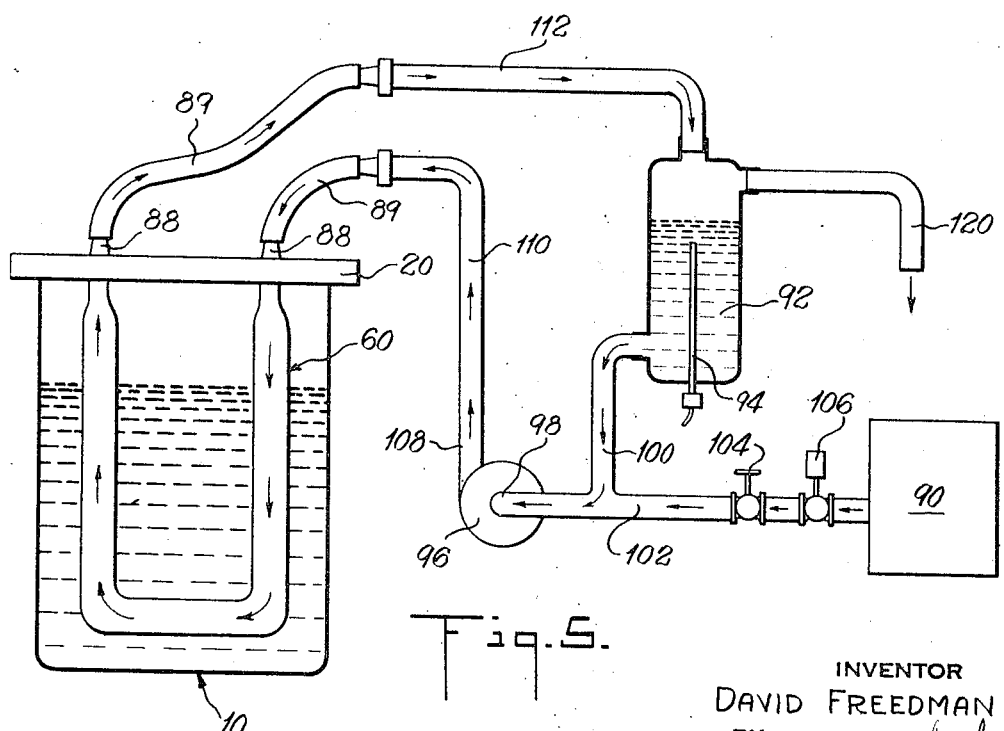

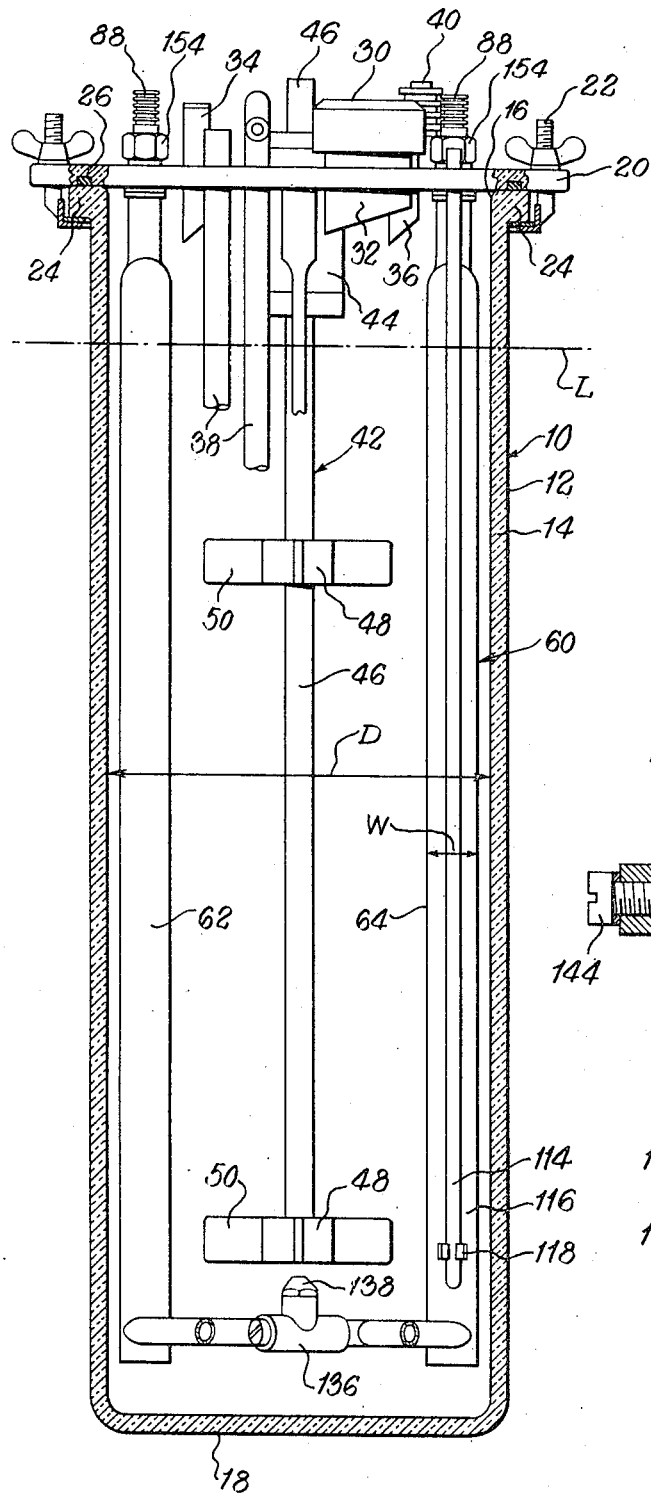
Fig. 2.
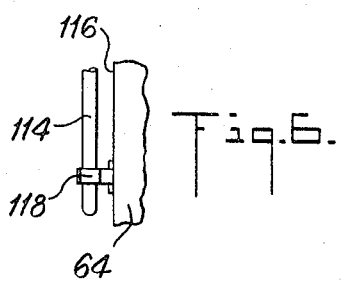
Fig. 7.
Fig. 6.
INVENTOR.
DAVID FREEDMAN

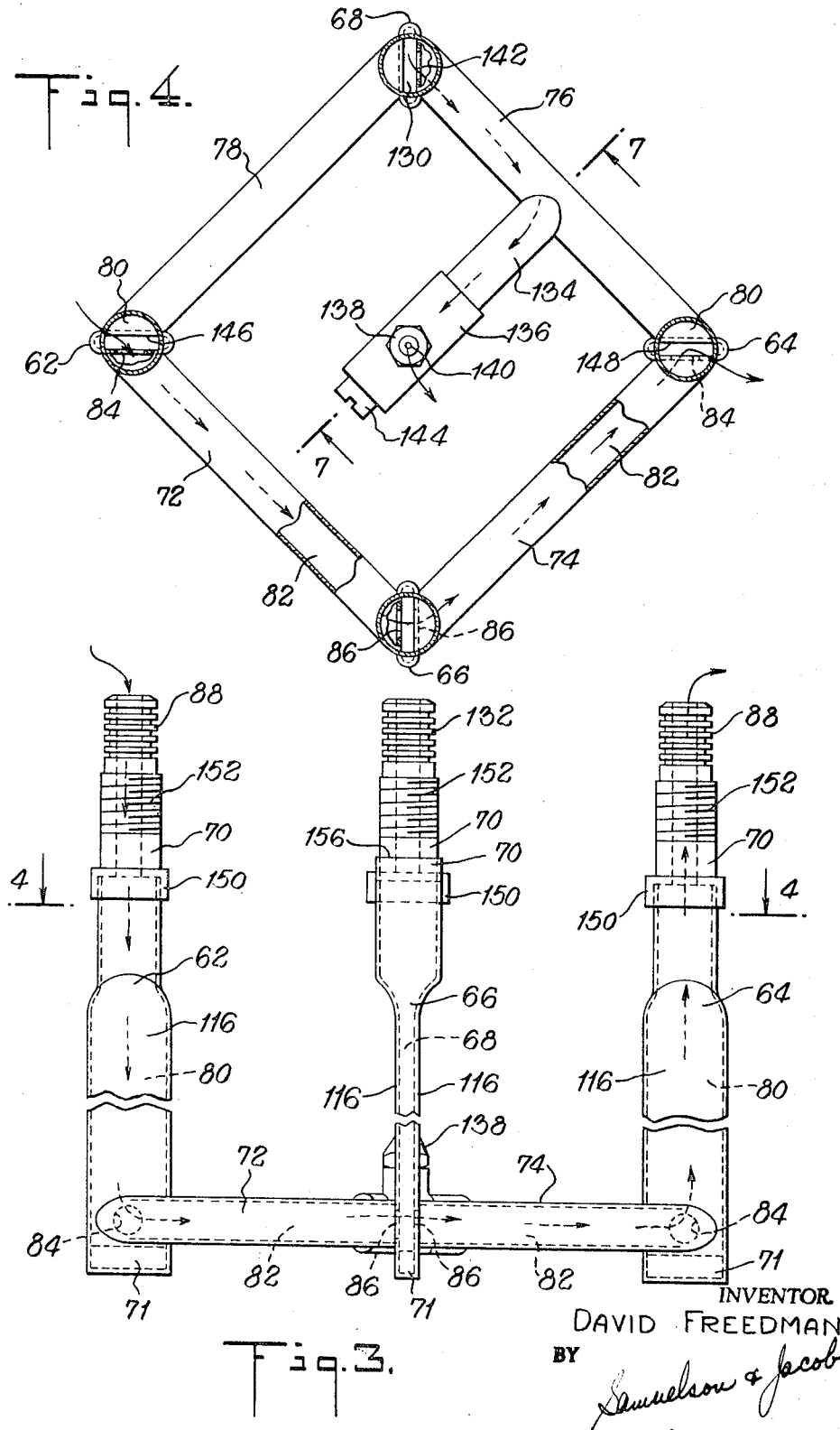

3,445,342
FERMENTATION APPARATUS
David Freedman, Highland Park, N.J., assignor to New Brunswick Scientific Co., Inc., a corporation of New Jersey
Filed Feb. 11, 1966, Ser. No. 526,764
Int. Cl. C12b 1/22
U.S. Cl. 195—142                      15 Claims

ABSTRACT OF THE DISCLOSURE

A vessel for containing a culture growth medium which has an open mouth and a removable head plate with an impeller in the vessel for agitating the growth medium and a baffle assembly in the vessel for providing turbulence and shearing action in the agitated growth medium and for establishing a path through the medium for circulating a heat exchange medium to control the temperature of the growth medium in response to a temperature sensing device located within the vessel and proximate to the baffle assembly for sensing the temperature of the medium and the baffle assembly.

---

The present invention relates generally to fermentation apparatus and pertains more specifically to improvements in apparatus for the cultivation of a broad range of organisms including aerobic and anaerobic bacteria, streptomycetes, molds and yeasts, as well as mammalian and plant tissue cultures and others in laboratory or pilot-plant studies under carefully controlled conditions of temperature, pressure, aeration, agitation, and the like.

In conducting microbial investigations both in laboratory and pilot-plant studies it has become increasingly important that such studies be accomplished under a wide range of fermentation conditions in apparatus where such conditions can be closely controlled. It would, therefore, be advantageous to have available simplified, relatively small fermentation apparatus which is capable of attaining carefully controlled conditions of temperature, pressure, agitation, and gas flow with minimum complexity.

An object of the invention is to provide relatively small fermentation apparatus including simplified means for controlling the overall agitation and the temperature of a culture growth medium therein.

Another object of the invention is to provide such a fermentation apparatus wherein the means for controlling the amount of agitation, turbulence, shearing action and temperature is in the form of a simplified unitary assembly.

A further object of the invention is to provide means for introducing a controlled amount of gas at a predetermined rate into the culture growth medium at the desired location within relatively small fermentation apparatus without increasing the number of conduits penetrating the culture growth medium.

A still further object of the invention is to provide a unitary baffle assembly for effecting turbulence and shearing action in the agitated culture growth medium, the baffle assembly also serving as a heat exchanger for either heating or cooling the culture growth medium and as a conduit for conducting gas into the culture growth medium at a predetermined location.

The above objects, as well as further objects and advantages, are attained in the present invention which may be described briefly as a fermentation apparatus including a vessel for containing a culture growth medium, the vessel having an open mouth, a removable head plate covering the mouth of the vessel, impeller means extending into the vessel and mounted in the head plate for rotation within the vessel for agitating the growth medium, a baffle assembly fixed to the head plate and extending into the vessel and into the growth medium for providing turbulence and shearing action in the agitated growth medium, the baffle assembly including at least two hollow tubular baffle members, each having an unobstructed passage therein and means interconnecting the passages to one another to establish a path passing through the baffle members and through the growth medium, means for circulating a heat exchange medium through the growth medium along the path, means mounted upon the baffle assembly and immersed in the growth medium for sensing the temperature of the medium and the temperature of the baffle assembly, and means responsive to the temperature sensing means for regulating the temperature of the heat exchange medium supplied to the baffle assembly by the circulating means to maintain the growth medium at a predetermined temperature, the impeller means and baffle assembly being in such relation with the head plate as to be removed from the vessel upon removal of the head plate from the mouth of the vessel. The invention also contemplates a baffle assembly in the above apparatus which has at least three hollow tubular baffle members and means providing at least one orifice in the baffle assembly, two of the three baffle members providing a first path for the heat exchange medium and the third providing a second path for gas which is to be introduced into the growth medium in controlled amounts and predetermined rates through the orifice means. The invention is further concerned with the baffle assembly as described above for use in connection with the entire fermentation apparatus as described.

The invention will be more fully understood and further objects and advantages of the invention will become apparent in the following detailed description of an embodiment of the invention illustrated in the accompanying drawing, in which:

FIGURE 1 is a perspective view of a fermentation apparatus constructed in accordance with the invention;

FIGURE 2 is a longitudinal cross-sectional view of the fermentation vessel employed in the apparatus of FIGURE 1;

FIGURE 3 is an enlarged elevational view of the baffle assembly in the apparatus of FIGURES 1 and 2;

FIGURE 4 is a cross-sectional view taken along line 4—4 of FIGURE 3;

FIGURE 5 is a schematic illustration of the temperature regulation system in the apparatus of FIGURE 1 employing the baffle assembly of FIGURE 3;

FIGURE 6 is a detail of the baffle assembly viewed from line 6—6 of FIGURE 2; and FIGURE 7 is a cross-sectional view taken along line 7—7 of FIGURE 4.

Referring now to the drawing, and especially to FIGURE 1, a fermentation apparatus is pictured at 2 and includes a housing 4 with a control panel 6 and a recess 8. The apparatus is relatively small so that it may be employed in a table-top installation and is generally self-contained, as will be described below, for ease of installation and use in a laboratory.

Mounted within recess 8 is a growth vessel 10. As best seen in FIGURES 1 and 2, the growth vessel 10 of fermentation apparatus 2 is generally cylindrical and is comprised of a jar 12 having a cylindrical wall 14 extending from an open top 16 to a closed bottom 18. Jar 12 is seen to be fabricated of a transparent material such as glass or plastic for purposes which will be explained hereinafter, but may be made of metals or other materials. Top 16 is closed during use by means of a cover or head plate 20 which is held in place by means of screw clamps 22 which cooperate with an annular flange 24 integral with the wall of the jar, a resilient gasket 26 serving to seal the head plate against the jar when the screw clamps are tightened.

In using the fermentation apparatus 2 of which vessel 10 is a part, a culture growth medium is placed within the jar 12 and fills the jar up to the level indicated approximately by dashed line L. Apertures are provided in the head plate to accommodate a variety of functions and devices. For example, a cap 30 is shown closing an inoculation port 32 while supplementary ports 34 and 36 are plugged for future use. Further apertures provide for sampling lines 38 and a foam-sensing probe assembly 40.

In order to agitate the culture growth medium in a radial pattern and achieve uniform dispersion of constituents in the medium, an impeller assembly 42 is mounted for rotation in the vessel by means of a bearing housing assembly 44 which is fixed in the head plate 20 and which carries drive shaft 46 of the impeller assembly through the head plate for rotation by external means 47 (FIGURE 1). Impellers are shown in the form of two turbine-type impellers 48 which are mounted upon the drive shaft 46 and have flat stirring paddles 50 for operation in even the most viscous culture medium. The impellers are fixed to the drive shaft during operation, but may be removed therefrom and may be replaced by any of a variety of impellers having configurations designed for specific fermentation operations. The positions of the impellers along the drive shaft are adjustable so as to allow for the processing of smaller or larger working volumes in jar 12 as desired. Additional impellers may be employed for more intense agitation and greater aeration.

The necessary turbulence and shearing action is established in the agitated culture growth medium by means of a baffle assembly 60 which is also fixed in the head plate, as will be described below, and provides baffle members 62, 64, 66 and 68 extending vertically from the top of the jar toward the bottom. The concentric arrangement of the impeller and baffle assemblies in the jar of the vessel provides the requisite agitation, turbulence and shearing action in the culture growth medium.

Ordinarily, the temperature of the culture growth medium in the vessel of a fermentation apparatus is maintained at the required level by jacketing of the vessel to allow water or another heat exchange medium to be circulated about the jar of the vessel for heating or cooling purposes or by immersing the vessel in a water bath. Jacketed vessels are more complex and more expensive than a single-walled jar, however, and are hence less desirable in providing a less expensive fermentation apparatus of relatively small proportions. Both jacketed systems and water bath systems suffer from a time lag between a change in the temperature of the heat exchange medium and a corresponding change in the temperature of the culture growth medium due to the time required for the vessel wall to transfer heat between the heat exchange medium and the culture growth medium in such systems. The inability of these systems to respond quickly to temperature changes may be characterized as "thermal lag" and renders such systems difficult to control with a high degree of accuracy with respect to the temperature of the culture growth medium. Jacketing and water bath can be eliminated by the provision of internal conduits which could carry a heat exchange medium through the growth medium; however, it is desirable to maintain the number of conduits within the jar of the vessel at a minimum, especially in vessels having a relatively small capacity, for example one-half to eleven liters, so that the reduction in the usable volume of the vessel by the insertion of conduits will not reduce the capacity to an uneconomically small amount in comparison to the overall size of the vessel. Furthermore, the presence of additional conduits within the vessel can detract from the turbulence in the growth medium by slowing the motion of the liquid and thus can disturb the prescribed cooperation between the impellers and the baffles and disrupt the operation of the apparatus. The baffle assembly 60 eliminates the necessity for external jacketing or additional internal conduits to attain a controlled temperature in the culture growth medium as will now be explained in connection with FIGURES 3 and 4.

Baffle assembly 60 is a unitary structure having baffle members 62, 64, 66 and 68 each extending vertically from a head 70 to a base 71. The baffle members are interconnected adjacent the bases thereof by means of horizontal elements 72, 74, 76 and 78. As best seen in FIGURE 4, the horizontal elements each lie on the perimeter of a regular polygon shown in the form of a square with the baffle members each intercepting the square at a corner thereof so that a relatively rigid, easily fabricated box-like structure is established adjacent the base of the baffle assembly. Different configurations in the structure adjacent the base are possible, particularly where the number of baffle members is increased or decreased.

Each of the pair of diametrically opposed baffle members 62 and 64 is a hollow tubular member provided with an unobstructed passage 80 extending from head to base thereof. Each of the horizontal elements 72 and 74 is also hollow and tubular and is provided with an unobstructed passage 82. Passages 82 are interconnected with each of the passages 80 at openings 84 adjacent the bases of baffle members 62 and 64 and are interconnected with one another through openings 86 adjacent the base of baffle member 66 so that an open path is established from the head of baffle member 62 to the head of baffle member 64 through each of these baffle members and through horizontal elements 72 and 74. Each head 70 of baffle members 62 and 64 is provided with means, shown in the form of a hose fitting 88, for receiving a heat exchange medium which can be circulated through the growth medium along the path defined by the passages in baffle members 62 and 64 and horizontal elements 72 and 74.

Fermentation apparatus 2 includes an integral recirculating water system connected by means of hoses 89 (see FIGURES 1 and 5) to hose fittings 88 so that either warm or cool water may be circulated through the culture growth medium along the path provided by baffle assembly 60 (as indicated by the arrows in FIGURES 3, 4 and 5) for heating or cooling the medium to maintain a desired temperature level. As illustrated schematically in FIGURE 5, the integral recirculating water system is connected to an outside source of relatively cool water, such as a tap 90, and includes a reservoir 92 having an immersion heater 94 therein. A circulating pump 96 is connected at its inlet 98 to a first conduit 100 connected to the reservoir and a second conduit 102 connected to the tap through a water throttling valve 104 and a water-feed solenoid valve 106. The outlet 108 of the pump is connected to one hose 89 leading to a fitting 88 in baffle assembly 60 through conduit 110 and a return conduit 112 completes a circuit for water leaving the baffle assembly through second hose 89 and returning to the reservoir. As best seen in FIGURES 2 and 6, the baffle assembly 60 is provided with a temperature sensing means shown in the form of a tubular element 114 fixed to one of the planar side faces 116 of a baffle member through which water is circulated. Tubular element 114 contains a temperature sensing device, such as a thermistor, and is spaced from planar side face 116, as well as fixed thereto, so that the temperature detected by the sensing device will be that of the tubular element which temperature is related to the temperature of the growth medium and the temperature of the baffle member, heat being conducted between the baffle member and the tubular element through the support clip 118 which fixes and spaces the tubular element with respect to the baffle member. It will be apparent that the location of the temperature sensing device essentially within the culture growth medium in conjunction with the employment of the baffle assembly which provides a path through the culture growth medium for the heat exchange medium attains quick response to temperature changes in the culture growth medium and a reduction in thermal lag to achieve a corresponding quick heat transfer between the growth medium and the heat exchange medium to maintain close and accurate temperature control in the culture growth medium. Since the vessel wall no longer affects such heat transfer, thermal lag is reduced to a minimum. Such quick response in temperature control is particularly important in fermentation operations where excessive heating or cooling, even for short periods of time and in localized areas, can cause harmful effects such as the killing of bacteria. Because of the relationship between the temperature sensing means and the baffle assembly, the walls of the baffle members are kept at a relatively even temperature to prevent excessive increases or decreases in temperature at the baffle surfaces and preclude the concomitant adverse effects of such temperatures.

During the operation of apparatus 2, the circulating pump operates to continuously circulate water from the reservoir through the baffle assembly in the direction of the arrows in FIGURE 5. Should the temperature of the growth medium drop below a predetermined desired level, the drop will be detected by the temperature sensing device in tubular element 114 and, through an electrical circuit passing upwardly through tubular element 114 and out of jar 12 into the supplementary apparatus, the device will energize the immersion heater 94 to heat the circulating water and thus heat the growth medium. Should the temperature of the growth medium rise above the predetermined temperature level, the temperature sensing device will actuate the water-feed solenoid valve allowing cool water to flow through the baffle assembly and cool the growth medium, the water throttling valve serving to reduce the flow of tap water to an acceptable level and thus reduce surge. Any excess water in the recirculating system will flow out of the overflow pipe 120. Thus, thermal lag is reduced to a minimum and a close control is maintained automatically over the temperature of the growth medium.

In fermentation processes it is often necessary to introduce air or other gases into the culture growth medium adjacent the bottom of the growth vessel so that the gas will rise and bubble through the growth medium. Thus, fermentation vessels generally include at least one sparger line leading to a sparger located beneath the lowest impeller. As explained above, it is desirable in relatively small fermentation vessels to reduce the number of conduits, or "penetrations," within the vessel to a minimum. Baffle assembly 60 serves to further reduce the number of conduits by providing an unobstructed passage 130 extending from head to base of baffle member 68, which is also a hollow tubular member, and a hose fitting 132 in head 70 thereof for receiving a hose which can be connected to a source of air or another gas. As best seen in FIGURES 4 and 7, a leg 134 extends radially from horizontal element 76 and includes means illustrated in the form of a fitting 136 with a nozzle 138 therein lying below the lowermost impeller and providing an orifice 140 aligned with the central axis of the jar 12. Leg 134, fitting 136 and horizontal element 76 have interconnected unobstructed internal passages which are, in turn, interconnected with passage 130 through an opening 142 adjacent the base of baffle member 68. Thus, an open path is established between head 70 of baffle member 68 and orifice 140 so that gas supplied from a source to the head of baffle member 68 will be introduced into the growth medium at a desired location (as indicated by the arrows in FIGURE 4) without the necessity for an additional conduit or separate sparger line. A threaded plug 144 may be removed to enable cleaning of the internal portions of the fitting and the leg so as to maintain an unobstructed path for the gas. It will be apparent that the single orifice nozzle 138 may be replaced with means providing a plurality of orifices, such as a ring sparger containing a series of perforations along the circumference thereof, or a sintered disk sparger having a porous structure providing a multiplicity of orifices in the form of pores, the construction of fitting 136 upon leg 134 allowing interchangeability among a variety of sparger structures in baffle assembly 60.

It is noted that the path of the heat exchange medium through baffle members 62 and 64 and horizontal elements 72 and 74 is isolated from the path of the gas through baffle member 68, horizontal member 76 and leg 134 by virtue of the partitions provided at 146 and 148 by the walls of baffle members 62 and 64, respectively.

Each of the baffle members is provided with flat, generally planar side faces 116 which are parallel to a radially extending width W (see FIGURE 2). It has been found that optimum operation of the baffle members in providing turbulence and shearing action in the agitated growth medium can be obtained by providing the baffle members with such flattened side walls and with a width W approximately 0.08 to 0.10 times the internal diameter D of the jar. The dimensions of the baffle members obtained by following the above ratio of baffle member width W to growth vessel diameter D permit the baffle assembly to operate not only as means for imparting such turbulence and shearing action but are great enough to provide sufficient surface area to attain the necessary heating or cooling of the growth medium as well as providing sufficient volume for a sparger.

The entire baffle assembly 60 is readily fabricated in a unitary structure by joining a series of hollow tubular components which form the baffle members and horizontal elements. For example, the components may be made from stainless steel tubing and welded together into an integral baffle assembly. The wall thickness of the baffle members is preferably maintained relatively thin so as to enhance the conductivity of heat between the heat exchange medium and the culture growth medium and reduce thermal lag to a minimum. A wall thickness of approximately 0.018 inch has been found satisfactory in apparatus of the size and capacity set forth above.

Baffle assembly 60 is fixed in head plate 20 by means of heads 70 of baffle members 62, 64 and 68 passing through apertures provided in the head plate and being seated against the head plate at collars 150. Each of these heads 70 is threaded at 152 for receiving nuts 154 which secure the baffle assembly to the head plate with hose fittings 88 and 132 projecting outside the growth vessel. Since baffle member 66 requires no hose fitting it may be merely terminated at upper end 156 which is then seated in a complementary socket in head plate 20 when the head plate and the baffle assembly are assembled; however, if desired, baffle member 66 may also project through head plate 20 and be anchored in the same manner as members 62, 64 and 68 for increased rigidity. The entire assembly including the vessel, baffle assembly and impeller means may be removed from the housing and may be sterilized as a unit. When screw clamps 22 are loosened and head plate 20 is removed from the jar 12, baffle assembly 60, as well as impeller assembly 42, are removed from the jar 12 for ease of inspection and cleaning of the head plate and the other related components. Since the baffle assembly and impellers are readily interchangeable with similar component parts, the fermentation apparatus 2 is rendered even more flexible in use.

It is noted that in accomplishing the elimination of external jacketing and excessive number of internal conduits, growth vessel 10 has been rendered especially well-suited to low cost photosynthetic illumination. Since there is no external jacketing around jar 12, the jar may be fabricated of a transparent material, such as glass, and interchangeable semi-circular light manifolds with high-output neon and/or fluorescent illumination are readily installed either partially or completely around the growth vessel. In addition, a combination of light sources having a variety of wave-lengths may be economically employed. For example, the combination of incandescent lamps placed inside the jar and fluorescent lamps placed outside the jar is easily accommodated. Any excess heat generated in the growth medium by the employment of such light sources is readily carried away by the heat exchange medium circulating through the baffle assembly. The reduction of the number of conduits within the vessel is also conducive to the accomplishment of photosynthetic illumination of the growth medium from an external light source in that masking of the illumination by an otherwise large number of conduits is eliminated.

It can be seen that the improved baffle assembly described above accomplishes controlled conditions of temperature, agitation and gas flow with minimum complexity in relatively small, simplified fermentation apparatus, as well as additional flexibility of operation in laboratory or pilot-plant fermentations.

It is to be understood that the above detailed description of an embodiment of the invention is provided by way of example only. Various details of design and construction may be modified without departing from the true spirit and scope of the invention as set forth in the apended claims.

What is claimed is:

1. A fermentation apparatus comprising a vessel for containing a culture growth medium, the vessel having an open mouth, a removable headplate covering the mouth of the vessel and defining therewith a vessel and head plate assembly, impeller means extending into the vessel and carried by said assembly for rotation within the vessel for agitating the growth medium, baffle means carried by said assembly and extending into the vessel and into the growth medium for providing turbulence and shearing action in the agitated growth medium, said baffle means having inlet and outlet ends and a passage therethrough, means for circulating a heat exchange medium through said baffle means, temperature sensing means within said vessel proximate to said baffle means for sensing the temperature of the medium and the temperature of said baffle means, and means responsive to said temperature sensing means for regulating the temperature of the heat exchange medium supplied to said baffle means by said circulating means to maintain the growth medium at a predetermined temperature.

2. The fermentation apparatus of claim 1 wherein the means for circulating the heat exchange medium includes
means for receiving relatively cool liquid at a given temperature from a given source,
a reservoir for containing a supply of liquid,
a heater for heating the supply of liquid in the reservoir above said given temperature, and
means responsive to the temperature sensing means for selectively feeding either cool liquid from the source or heated liquid from the reservoir to the baffle means.

3. The fermentation apparatus of claim 2 including
a circulating pump having an inlet and an outlet,
means for conducting said heated liquid from the reservoir to the inlet,
means for conducting said cool liquid from the source to the inlet,
a valve in said cool liquid conducting means,
means for conducting said liquid from the outlet to the baffle means, and
means responsive to the temperature sensing means for actuating either the heater or the valve to accomplish the feeding of heated liquid or cool liquid, respectively, to the baffle means.

4. The fermentation apparatus of claim 1 wherein the baffle means includes
at least three hollow tubular baffle members, each having an unobstructed passage therein;
means interconnecting the passages of two of said members to one another to establish a first path passing through said two members and through said growth medium;
means providing at least one orifice in said baffle means;
means interconnecting the passage of the third of said hollow tubular baffle members with said orifice means for establishing a second path passing through said third member and into the growth medium;
means isolating said first path from said second path; and
means for introducing gas through said second path and into the growth medium at said orifice means;
said circulating means serving to circulate the heat exchange medium along said first path.

5. The fermentation apparatus of claim 4 wherein the baffle means includes
first and second diametrically opposed hollow tubular baffle members extending vertically from a head to the base of the baffle means and lying between the impeller and the vessel;
a vertically extending unobstructed passage in each said hollow tubular member;
a third hollow tubular baffle member extending vertically from head to base of the baffle means and lying between the impeller and the vessel;
a vertically extending unobstructed passage in said third hollow tubular member;
horizontally disposed elements interconnecting said baffle members adjacent the base of the baffle means;
means locating said orifice means adjacent the base of the baffle means;
means in said horizontal elements interconnecting the passages in the first and second baffle members to establish said first path between the heads of said first and second baffle members;
means in said horizontal elements interconnecting the orifice means with the passage in the third baffle member to establish said second path from the head of said third baffle member to said orifice means;
said heat exchange medium circulating means being attached to the heads of said first and second baffle members for circulating a liquid medium along said first path; and
said means for introducing gas being attached to the head of said third baffle member for introducing a gas through said second path.

6. The fermentation apparatus of claim 5 wherein said vessel is a cylindrical walled jar, said impeller means is aligned with the central axis of the jar, and the baffle means includes
at least two pairs of diametrically opposed baffle members each extending vertically from a head adjacent the top of the jar toward a base adjacent the bottom of the jar and lying between the radial extent of the impeller assembly and the jar wall and circumferentially spaced from one another, each baffle member having generally planar side faces generally parallel to a radially extending width, at least three of which baffle members are hollow tubular members;

a vertically extending unobstructed passage in each hollow tubular member;

horizontally disposed elements interconnecting each baffle member with an adjacent baffle member adjacent the bases thereof, at least three of which elements are hollow tubular elements;

a horizontally extending unobstructed passage in each of two of said three elements interconnecting the vertical passages in one pair of diametrically opposed baffle members to establish said first path between the heads of said one pair of baffle members;

a leg extending horizontally from the third of said three elements to the central axis of the jar, said leg including a horizontal unobstructed passage therein, said orifice means being located at the central axis of the jar and providing at least one orifice communicating with the horizontal passage in the leg;

a horizontal unobstructed passage in said third element interconnecting the passages in the third of said three baffle members and the leg to establish said second path from the head of the third baffle member to the orifice means;

said heat exchange medium circulating means being attached to the heads of said one pair of baffle members for circulating a liquid medium along said first path; and said means for introducing gas being attached to the head of said third baffle member for introducing a gas through said second path.

7. The fermentation apparatus of claim 6 wherein said hollow tubular members have a relatively thin wall thickness and said temperature sensing means is affixed to one of the baffle members of said one pair at a side face thereof and is spaced from said wall so as to sense the temperature of the growth medium as well as that of the baffle assembly.

8. The fermentation apparatus of claim 7 wherein the jar wall is transparent.

9. In fermentation apparatus including a vessel for containing a culture growth medium, impeller means within the vessel for agitating the growth medium and baffle means for providing turbulence and shearing action in the agitated growth medium, the improvement comprising:
 a baffle assembly which includes at least three hollow tubular baffle members, each having an unobstructed passage therein;
 means interconnecting the passages of two of said members to one another to establish a first path passing through said two members and through said growth medium;
 means providing at least one orifice in said baffle assembly;
 means interconnecting the passage of the third of said hollow tubular baffle members with said orifice means for establishing a second path passing through said third member and into said growth medium;
 means isolating said first path from said second path;
 means for receiving a heat exchange medium to be circulated through said growth medium along said first path; and
 means for receiving gas to be introduced through said second path and into said growth medium at said orifice means.

10. In fermentation apparatus including a cylindrical vessel for containing a culture growth medium and an impeller within the vessel for agitating the growth medium, a baffle assembly as defined in claim 9 and including
 first and second diametrically opposed hollow tubular baffle members extending vertically from a head to the base of the assembly and lying between the impeller and the vessel;
 a vertically extending unobstructed passage in each said hollow tubular member;
 a third hollow tubular baffle member extending vertically from a head to the base of the assembly and lying between the impeller and the vessel;
 a vertically extending unobstructed passage in said third hollow tubular member;
 horizontally disposed elements interconnecting said baffle members adjacent the base of the assembly;
 said orifice means providing at least one orifice in said baffle assembly adjacent the base thereof;
 means in said horizontal elements interconnecting the passages in said first and second baffle members to establish said first path between the heads of said first and second baffle members, which path passes through said growth culture;
 means in said horizontal elements interconnecting said orifice means with the passage in said third baffle member to establish said second path from the head of said third baffle member to said orifice means, which path passes into a portion of said vessel for containing said growth medium;
 said means for receiving a heat exchange medium including means at the heads of said first and second baffle members for permitting the attachment of a liquid circulating system for circulating a liquid heat exchange medium through said growth medium along said first path; and
 said means for receiving gas including means at the head of said third baffle member for permitting the attachment of a source of gas to be introduced through said second path and into the growth medium at said orifice means.

11. In fermentation apparatus as defined in claim 10 the improvement wherein the vessel includes a head plate and the three baffle members pass through the head plate at their respective heads and are affixed to the head plate for removal of the baffle assembly from the vessel upon removal of the head plate.

12. In fermentation apparatus including a growth vessel having a cylindrical walled jar for containing a culture growth medium and an impeller assembly within the jar and aligned with the central axis of the vessel for agitating the growth medium, a unitary baffle assembly as defined in claim 9 and including
 at least two pairs of diametrically opposed baffle members each extending vertically from a head adjacent the top of the jar toward a base adjacent the bottom of the jar and lying between the radial extent of the impeller assembly and the jar wall and circumferentially spaced from one another, each baffle member having generally planar side faces generally parallel to a radially extending width, at least three of which baffle members are hollow tubular members;
 a vertically extending unobstructed passage in each hollow tubular member;
 horizontally disposed elements interconnecting each baffle member with an adjacent baffle member adjacent the bases thereof, at least three of which elements are hollow tubular elements;
 a horizontally extending unobstructed passage in each of two of said three elements interconnecting the vertical passages in one pair of diametrically opposed baffle members to establish said first open path between the heads of said one pair of baffle members;
 a leg extending horizontally from the third of said three elements to the central axis of the jar, said leg including a horizontal unobstructed passage therein, said orifice means being at the central axis of the vessel and providing at least one orifice communicating with said horizontal passage in the leg;
 a horizontal unobstructed passage in said third element interconnecting the passages in the third of said three baffle members and the leg to establish said second open path from the head of the third baffle member to said orifice means;

said means for receiving a heat exchange medium including means at the heads of said one pair of baffle members for permitting the attachment of a liquid circulating system for circulating a liquid heat exchange medium through said growth medium along said first path; and said means for receiving gas including means at the head of said third baffle member for permitting the attachment of a source of gas to be introduced through said second path and into the growth medium at said orifice means.

13. In fermentation apparatus as defined in claim 12, the improvement wherein the vessel includes a head plate normally closing the top of the jar and the three baffle members pass through the head plate at their respective heads and are affixed to the head plate for removal of the baffle assembly from the jar upon removal of the head plate.

14. A fermentation apparatus as claimed in claim 1 wherein said temperature sensing means is mounted to said baffle means.

15. A fermentation apparatus as claimed in claim 14 wherein said impeller means and said baffle means are mounted to said head plate so as to be removed from said vessel upon removal of said head plate from the mouth of said vessel.

References Cited

UNITED STATES PATENTS

| | | | |
|---|---|---|---|
| 2,686,754 | 8/1954 | Monod | 195—143 |
| 2,793,166 | 5/1957 | Hatch | 195—143 |
| 3,015,612 | 1/1962 | Pirt et al. | 195—142 |

OTHER REFERENCES

Weyrich et al.: Ind. and Eng. Chem., vol. 45, pages 1153–1160 (1953).

ALVIN E. TANENKOLTZ, *Primary Examiner.*

U.S. Cl. X.R.

195—143